(12) United States Patent
Desjardins

(10) Patent No.: US 12,236,982 B2
(45) Date of Patent: Feb. 25, 2025

(54) RESONANT SUPPRESSOR FOR RECORD PLAYER TONE ARM

(71) Applicant: Kronos Audio Products Inc., Montreal (CA)

(72) Inventor: Louis Desjardins, Montreal (CA)

(73) Assignee: KRONOS AUDIO PRODUCTS INC., Montreal (CA)

( * ) Notice: Subject to any disclaimer, the term of this patent is extended or adjusted under 35 U.S.C. 154(b) by 25 days.

(21) Appl. No.: 18/101,355

(22) Filed: Jan. 25, 2023

(65) Prior Publication Data

US 2023/0238021 A1    Jul. 27, 2023

Related U.S. Application Data

(60) Provisional application No. 63/303,362, filed on Jan. 26, 2022.

(51) Int. Cl.
*G11B 3/31* (2006.01)

(52) U.S. Cl.
CPC ..................................... *G11B 3/31* (2013.01)

(58) Field of Classification Search
None
See application file for complete search history.

(56) References Cited

U.S. PATENT DOCUMENTS

| 1,094,166 | A | * | 4/1914 | Peltovitz | G11B 3/46 |
|---|---|---|---|---|---|
| | | | | | 369/163 |
| 1,552,032 | A | * | 9/1925 | Branch | G11B 33/06 |
| 4,079,943 | A | * | 3/1978 | Morita | G11B 3/14 |
| 4,101,133 | A | * | 7/1978 | Aoki | G11B 3/14 |
| 4,113,265 | A | * | 9/1978 | Lyeta | G11B 3/14 |
| | | | | | 369/252 |
| 4,127,274 | A | * | 11/1978 | Griffith | G11B 3/091 |
| | | | | | 369/255 |
| 4,147,364 | A | * | 4/1979 | Nakatsuka | G11B 3/12 |
| 4,154,445 | A | * | 5/1979 | Joannou | G11B 3/32 |
| | | | | | 369/255 |
| 4,332,024 | A | * | 5/1982 | Orchard | G11B 3/14 |

(Continued)

FOREIGN PATENT DOCUMENTS

| GB | 2035655 | A | * | 6/1980 | | G11B 3/18 |
|---|---|---|---|---|---|---|
| GB | 2103861 | A | * | 2/1983 | | G11B 3/14 |
| JP | 58220276 | A | * | 12/1983 | | |

(Continued)

*Primary Examiner* — William J Klimowicz
(74) *Attorney, Agent, or Firm* — Benoit&Cote Inc.; Mathieu Audet

(57) ABSTRACT

A tone arm for a record player is provided. The tone arm comprises an anterior arm section adapted for mounting a pickup cartridge thereto, an posterior arm section adapted for mounting to the record player, and a mounting component comprising a plurality of discrete contact surfaces that adapted for abutting one of i) anterior arm section and ii) the posterior arm section, and preferably discrete contact surfaces for each of the anterior arm section and the posterior arm section. Whereby, the mounting component is adapted to secure the anterior arm section and the posterior arm section to each other. Therefore, through the present document is described the mounting component, the tone arm, and a method of making the latter with the mounting component.

17 Claims, 14 Drawing Sheets

(56) References Cited

U.S. PATENT DOCUMENTS 4,404,315 A * 9/1983 Tsukagoshi ............. C08L 27/06
524/495
8,611,201 B2   12/2013 Desjardins

FOREIGN PATENT DOCUMENTS

| | | | |
|---|---|---|---|
| JP | S6022702 A | * | 2/1985 |
| JP | S6174101 A | * | 4/1986 |
| JP | S62110601 A | * | 5/1987 |
| SU | 1140150 A | * | 2/1985 |

* cited by examiner

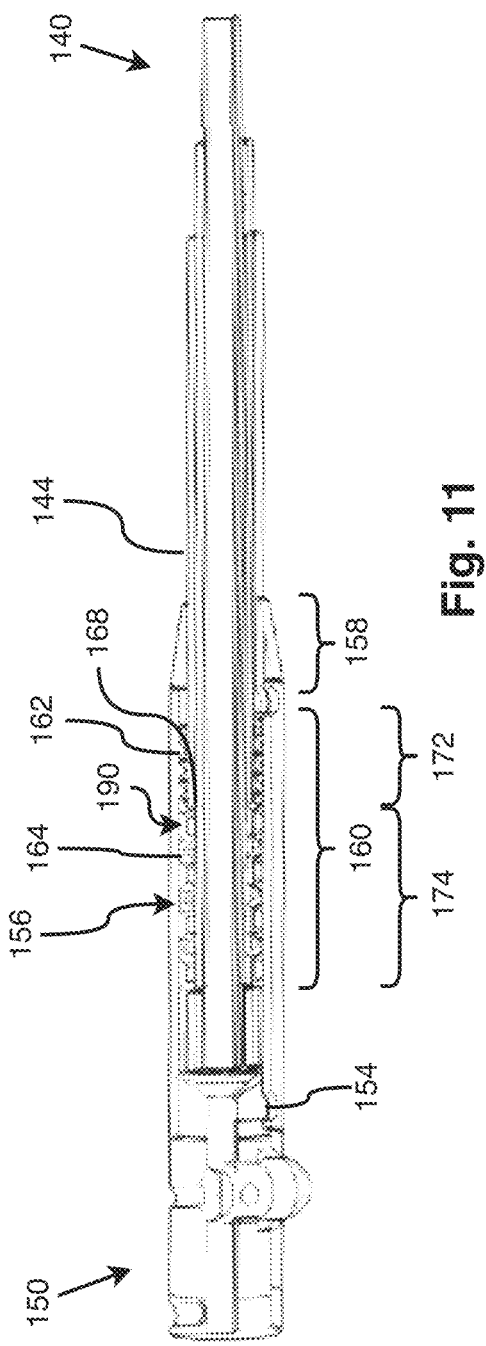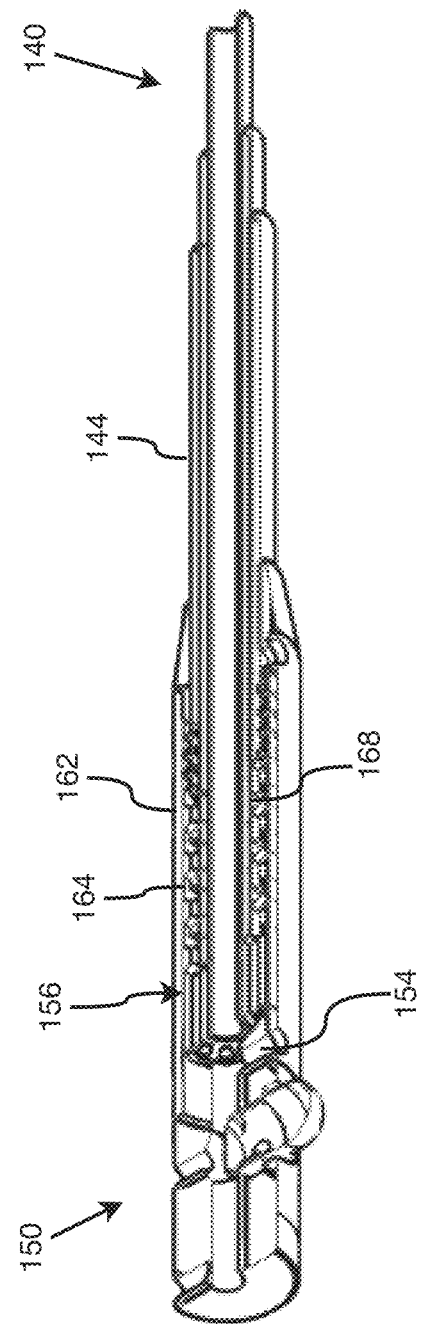
Fig. 11
Fig. 12

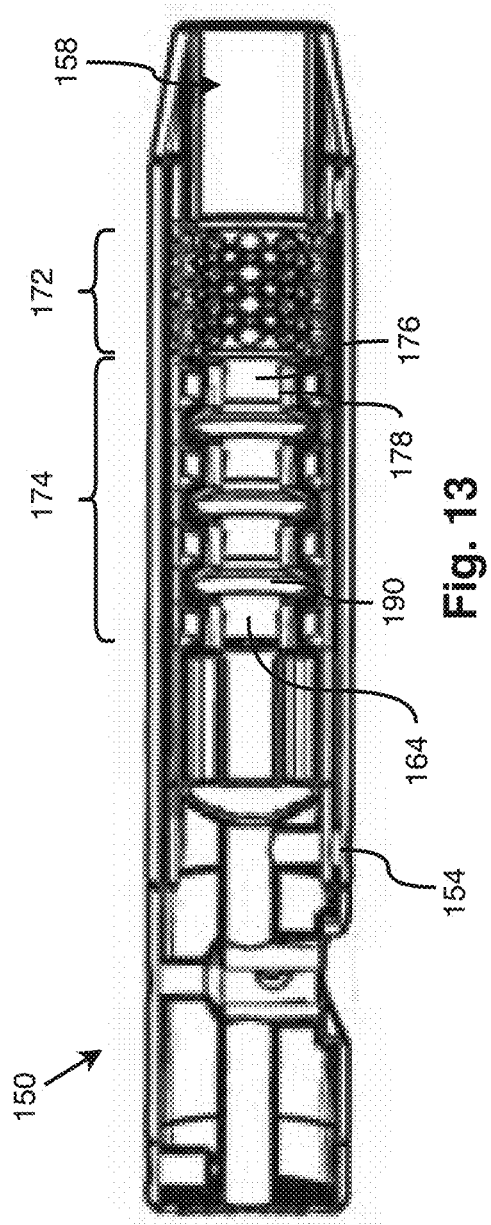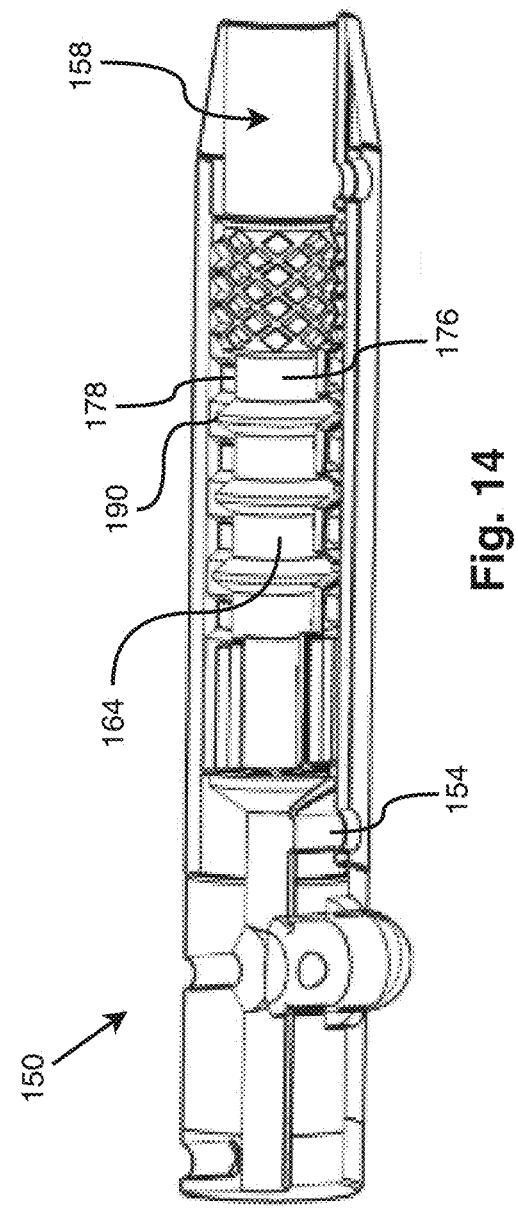

RESONANT SUPPRESSOR FOR RECORD PLAYER TONE ARM

CROSS-REFERENCE TO RELATED APPLICATION

This application relates to and is a non-provisional application claiming priority under 35 U.S.C. § 119 (e) from U.S. provisional patent application Ser. No. 63/303,362, filed Jan. 26, 2022, under 35 U.S.C. § 111, entitled RESONANT SUPPRESSOR FOR RECORD PLAYER TONE ARM, the specification of which is hereby incorporated herein by reference in its entirety.

BACKGROUND

(a) Field

The subject matter disclosed generally relates to tonearm devices and assembly. More particularly, the subject matter disclosed relates to tonearm structure adapted for limiting communication of vibrations through the tonearm of a record player.

(b) Related Prior Art

A phonographic turntable, or record player typically includes a tonearm suspension system to control the positioning of a phonographic needle at specific points on a phonographic record. The tonearm is typically controlled such that unwanted record skipping or excessive bearing wear is prevented. However, current tonearms are not adequately designed to prevent unwanted vibrations to be communicated from the motor or more generally from the structure of the record player to the stylus tracking the grooves of a record and vice-versa. Such vibrations have a potential effect on the quality of the sound captures by the stylus when tracking a groove.

There is therefore a need for improvement in the tonearm to decrease such undesirable effects.

SUMMARY

According to embodiments, there is provided a tone arm for a record player comprising at least two sections mounted to each other using a vibration-damping technique damping vibrations that are potentially communicated along the length of the tone arm from one extremity to the other. In some aspects, the vibration damping technique encompasses the use of a mounting component comprising a plurality of discrete contact surfaces, and of a resilient adhesive able to absorb vibrations once cured.

In some aspects, the techniques described herein relate to a tone arm for a record player, the tone arm including an anterior arm section adapted for mounting a pickup cartridge thereto; a posterior arm section adapted for mounting the tone arm to the record player, the posterior arm section including an open chamber; and a mounting component mounted in the chamber with the anterior arm section mounted thereto, the mounting component including a plurality of discrete contact surfaces abutting one of i) anterior arm section and ii) the posterior arm section, whereby the mounting component secures the anterior arm section and the posterior arm section to each other.

In some aspects, the techniques described herein relate to a tone arm, further including an elastomeric adhesive securing at least one of a) the anterior arm section to the mounting component; and b) the mounting component to the chamber of the posterior arm chamber.

In some aspects, the techniques described herein relate to a tone arm, wherein the mounting component includes: an interior wall; an exterior wall; and at least one of i) a channel and ii) an opening extending therethrough between the interior wall and the exterior wall, wherein the elastomeric adhesive is deposited in the channel or opening.

In some aspects, the techniques described herein relate to a tone arm, wherein the elastomeric adhesive is adapted to damp vibration between the anterior arm section and the posterior arm section.

In some aspects, the techniques described herein relate to a tone arm, wherein the mounting component includes at least one ridge having an apex providing one of the contact surfaces.

In some aspects, the techniques described herein relate to a tone arm, wherein one of the chamber and a secured portion of the anterior arm section has a cylindrical wall having a periphery, and wherein the ridge abuts the wall over the periphery.

In some aspects, the techniques described herein relate to a tone arm, wherein the mounting component includes a channel located between two contact surfaces.

In some aspects, the techniques described herein relate to a tone arm, wherein the mounting component has an interior wall, an exterior wall, a length and an axis; a ridge extending perpendicular to the axis at a location along the length of the mounting component over a first wall among the interior wall and the exterior wall; and a channel extending perpendicular to the axis at the location of the mounting component over a second wall among the interior wall and the exterior wall.

In some aspects, the techniques described herein relate to a tone arm, wherein one of the contact surfaces includes a lattice.

In some aspects, the techniques described herein relate to a tone arm, wherein the lattice includes crisscrossed radially extending walls with radial openings.

In some aspects, the techniques described herein relate to a tone arm, wherein the mounting component has an axis, and wherein the mounting components have a plurality of radial openings extending side-by-side.

In some aspects, the techniques described herein relate to a tone arm, wherein the mounting component has an interior wall, an exterior wall, an axis, and a partially hollow portion including a plurality of conduits extending parallel to the axis between the interior wall and the exterior wall.

In some aspects, the techniques described herein relate to a tone arm, wherein the mounting component has an interior wall, an exterior wall and an axis, the mounting component including at least two portions among a) lattice portion including crisscrossed radially extending walls; b) a ridged portion; and c) a partially hollow portion including a plurality of conduits extending parallel to the axis between the interior wall and the exterior wall, wherein the at least two portions provides the plurality of discrete contact surfaces.

In some aspects, the techniques described herein relate to a mounting component for mounting i) an anterior arm section adapted for mounting a pickup cartridge thereto to ii) a posterior arm section adapted to be mounted to a record player, the posterior arm section including an open chamber, the mounting component including a plurality of discrete contact surfaces abutting one of i) anterior arm section and ii) the posterior arm section, whereby the mounting component is adapted to secure the anterior arm section and the posterior arm section to each other.

In some aspects, the techniques described herein relate to a mounting component, further including at least one ridge having an apex providing one of the contact surfaces.

In some aspects, the techniques described herein relate to a mounting component, further including a channel located between two contact surfaces.

In some aspects, the techniques described herein relate to a mounting component, further including an interior wall, an exterior wall, an axis, and a partially hollow portion including a plurality of conduits extending in parallel to the axis between the interior wall and the exterior wall.

In some aspects, the techniques described herein relate to a mounting component, wherein one of the contact surfaces includes a lattice of crisscrossed radially extending walls.

In some aspects, the techniques described herein relate to a mounting component, further including an interior wall, an exterior wall, an axis, and a partially hollow portion including a plurality of conduits extending parallel to the axis between the interior wall and the exterior wall.

In some aspects, the techniques described herein relate to a mounting component, further including an interior wall, an exterior wall, and an axis, wherein the mounting component includes at least two portions among a) lattice portion including crisscrossed radially extending walls; b) a ridged portion; and c) a partially hollow portion including a plurality of conduits extending parallel to the axis between the interior wall and the exterior wall, wherein the at least two portions provides the plurality of discrete contact surfaces.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 11 and 12 are respectively a plan cross-section view and an oblique cross-section view of a posterior section assembly comprising the posterior arm section and the arm bridge according to the cross-section plan A-A identified in FIG. 5;

FIGS. 13 and 14 are respectively a plan cross-section view and an oblique cross-section view of the posterior arm section of a tone arm according to the cross-section plan A-A identified in FIG. 5;

It will be noted that throughout the appended drawings, like features are identified by like reference numerals.

DETAILED DESCRIPTION

Figure 1:
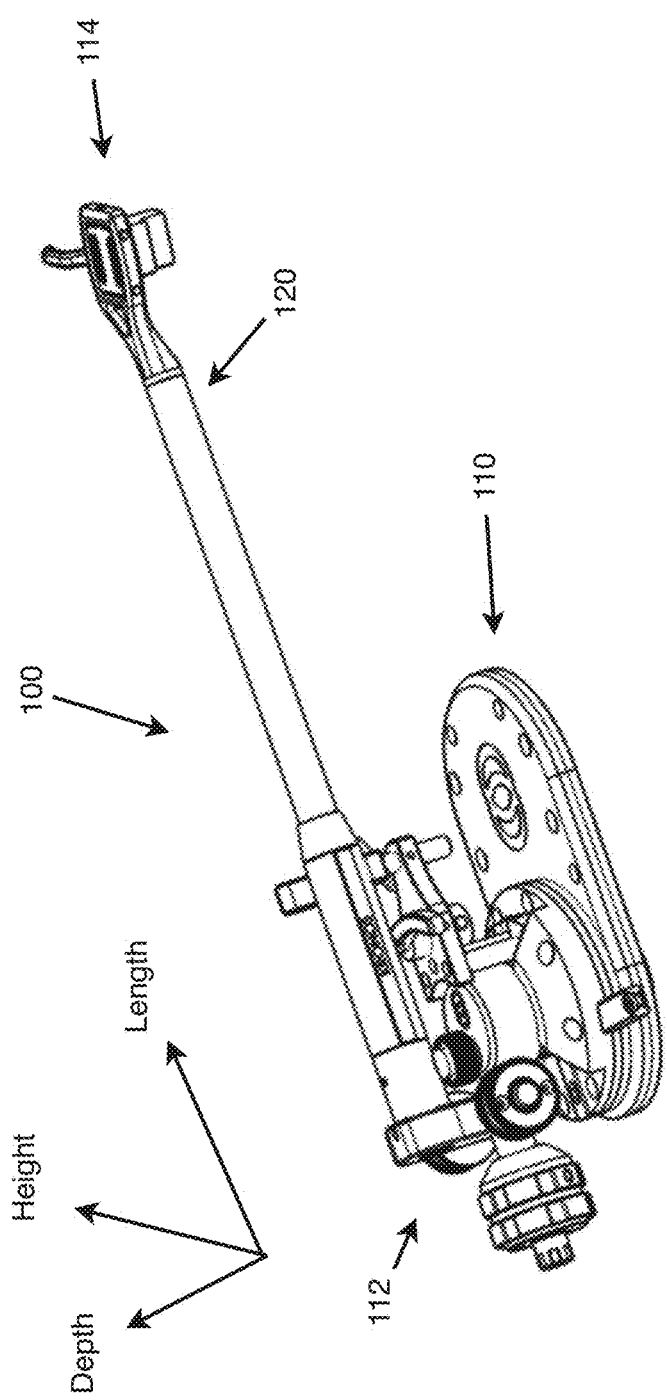
FIG. 1 is a perspective-elevated view of a tone arm assembly comprising a tone arm mounted to its base in accordance with an embodiment.

The realizations will now be described more fully hereinafter with reference to the accompanying figures, in which realizations are illustrated. The foregoing may, however, be embodied in many different forms and should not be construed as limited to the illustrated realizations set forth herein.

With respect to the present description, references to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values and of values herein or on the drawings are not intended to be limiting, referring instead individually to any and all values falling within the range, unless otherwise indicated herein, and each separate value within such a range is incorporated into the specification as if it were individually recited herein. The words "about", "approximately", or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described realizations. The use of any and all examples, or exemplary language ("e.g.," "such as", or the like) provided herein, is intended merely to better illuminate the exemplary realizations and does not pose a limitation on the scope of the realizations. No language in the specification should be construed as indicating any unclaimed element as essential to the practice of the realizations. The use of the term "substantially" is intended to mean "for the most part" or "essentially" depending on the context. It is to be construed as indicating that some deviation from the word it qualifies is acceptable as would be appreciated by one of ordinary skill in the art to operate satisfactorily for the intended purpose.

In the following description, it is understood that terms such as "first", "second", "top", "bottom", "above", "below", "posterior", "anterior" and the like, are words of convenience and are not to be construed as limiting terms.

It should further be noted that for purposes of this disclosure, the term "coupled" means the joining of two members directly or indirectly to one another. Such joining may be stationary in nature or movable in nature and/or such joining may allow for the flow of fluids, electricity, electrical signals, or other types of signals or communication between two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

The terms "top", "up", "upper", "bottom", "lower", "down", "vertical", "horizontal", "interior" and "exterior" and the like are intended to be construed in their normal meaning in relation with normal installation of the product, with an indication of the normal orientation of the tone arm assembly 100 and its components being provided on FIG. 1.

In realizations, there are disclosed a tone arm assembly 100 for installation on a record player.

It will be noted that throughout the appended drawings, like features are identified by like reference numerals.

Figure 2:
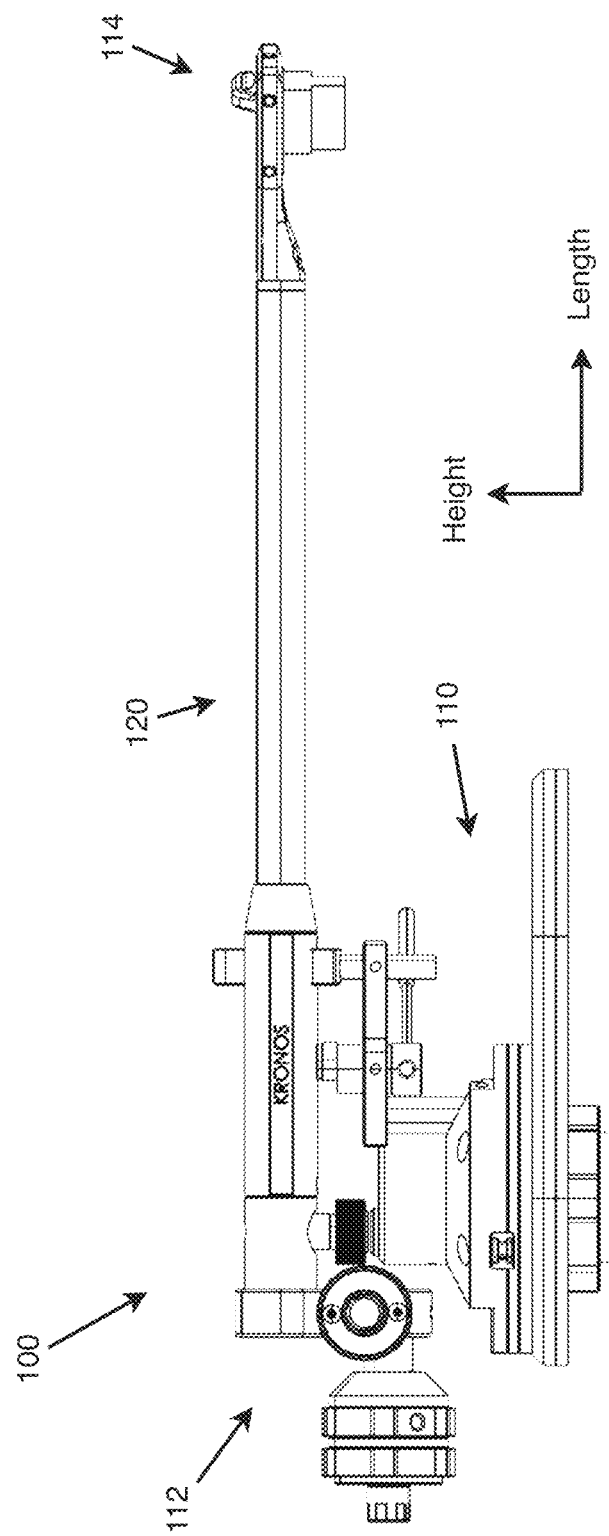
FIG. 2 is a side view of the tone arm assembly of FIG. 1.
Figure 3:
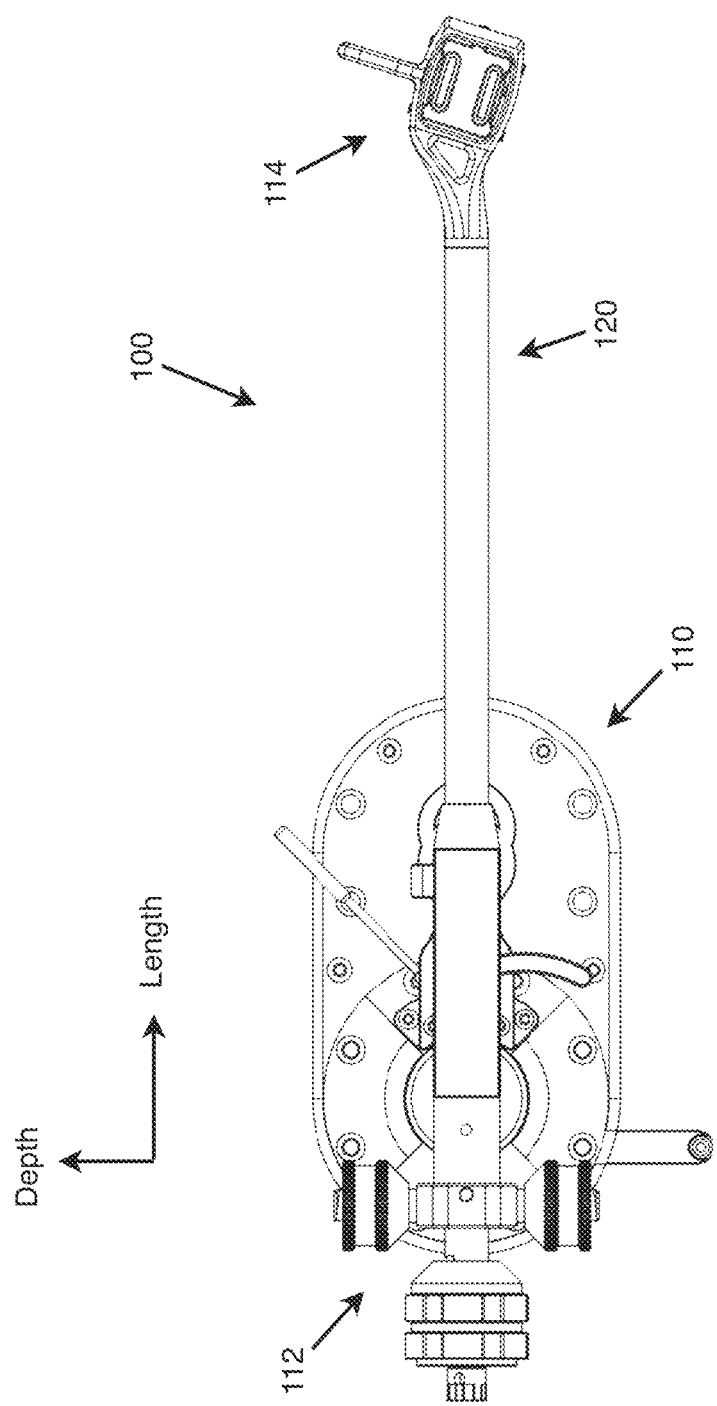
FIG. 3 is an elevation view of the tone arm assembly of FIG. 1.
Figure 4:
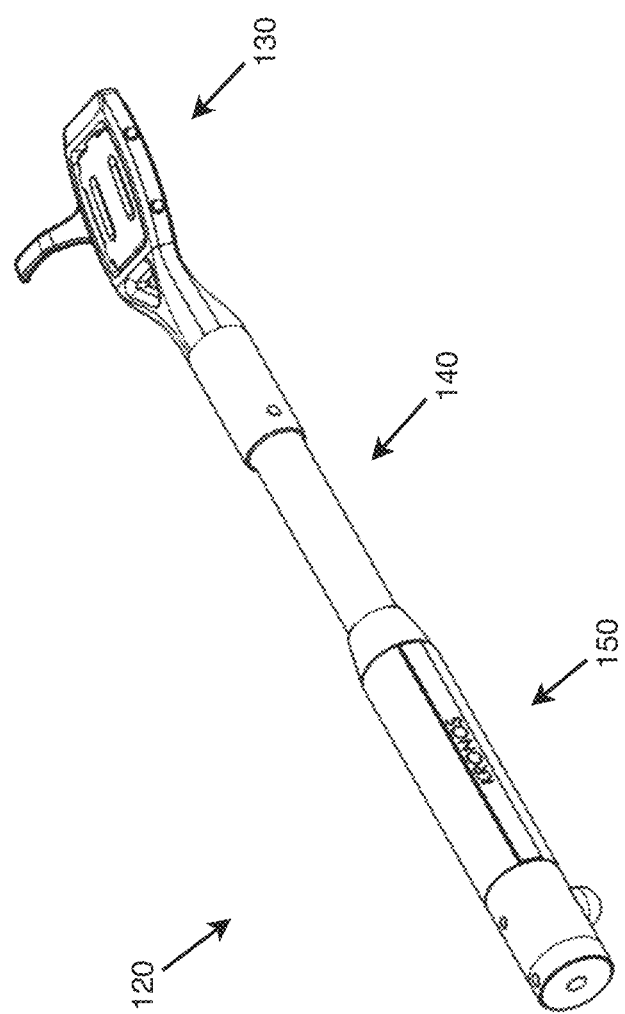
FIG. 4 perspective elevated view of a tone arm in accordance with an embodiment.
Figure 5:
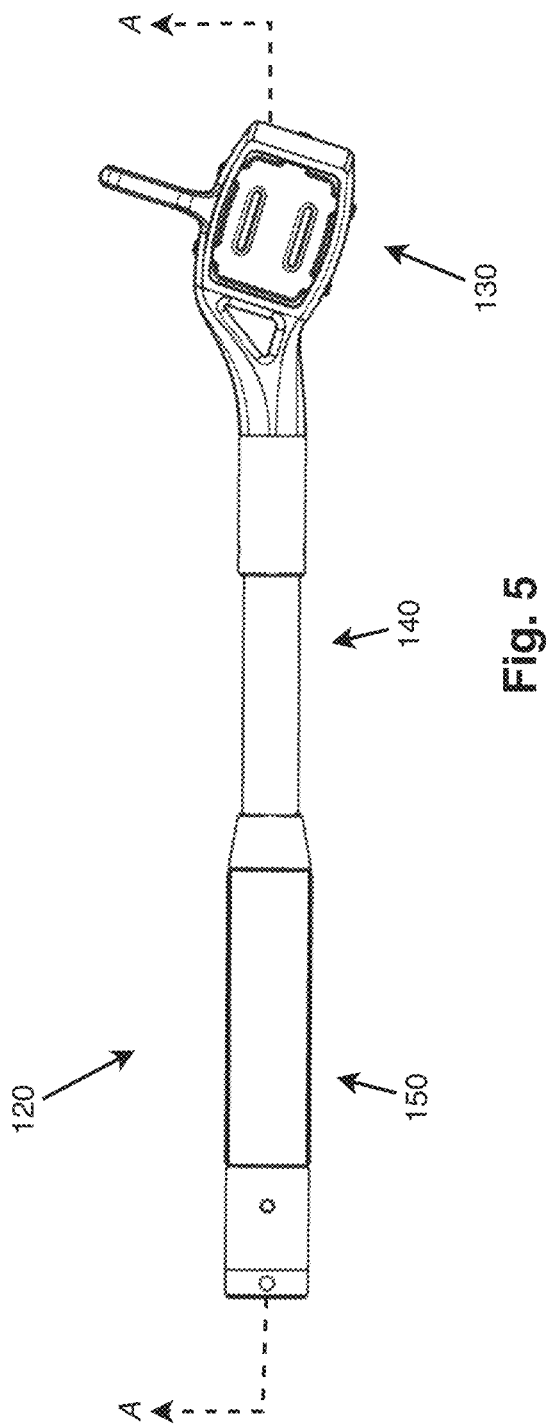
FIGS. 5 and 6 are respectively an elevated view and a side view of the tone arm of FIG. 4.
Figure 6:
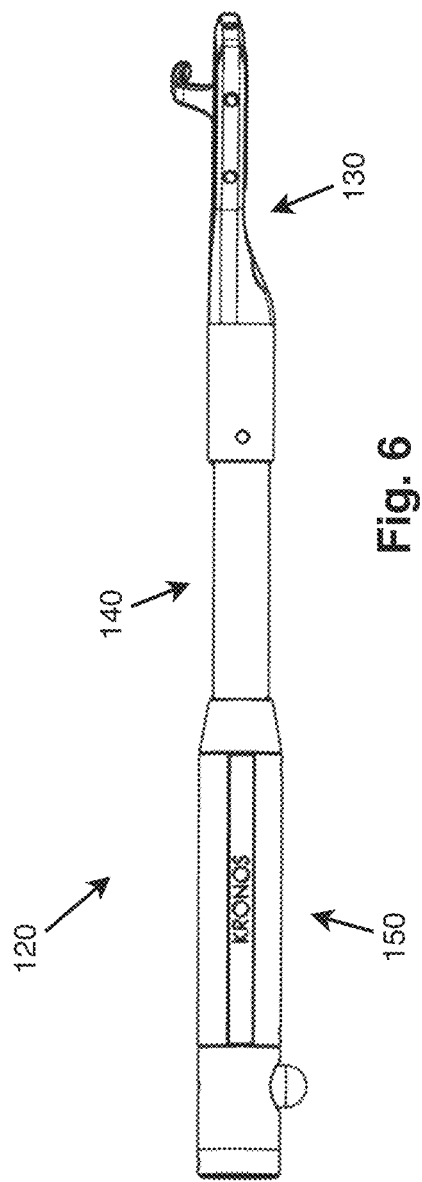

Referring now to the drawings, and more particularly to FIGS. 1 to 3, the tone arm assembly 100 comprises a base 110 and a tone arm 120 having a posterior portion 112 about the base 110 and an anterior portion 114 distant from the base 110. The base 110 is motorized for driving the elevation and rotation of the tone arm as the tone arm 120 at its anterior end holds a pickup cartridge (not depicted) over the groove of a record. The stylus of the pickup cartridge is adapted for tracking the groove with the desired force to give the optimal compromise between good tracking and minimizing wear of the stylus and record groove. Therefore, the function of the tone arm 120 may be summarized as a pivoted lever, free to move in two axes (vertical and horizontal) with a means to maintain tracking pressure.

Referring to FIGS. 3 to 6, the tone arm 120 is adapted to minimize the vibrations communicated along the length of the tone arm 120 and that would decrease the quality of the sound picked up by the stylus mounted thereon.

The tone arm 120 comprises an anterior arm section 130, a bridge section 140 and a posterior arm section 150 mounted to each other. The anterior arm section 130, the bridge section 140 and the posterior arm section 150 are designed with physical characteristics (combination of material, dimensions comprising length, inner diameter, outer diameter, moment of inertia, etc.) in such a way that their natural frequencies of vibration of the three sections 130, 140, 150 are different. As a result, the vibrations communicated through the tone arm 120 are damped both by the structure of the components of the tone arm 120 and by the assembly process of the anterior arm section 130, bridge section 140 and the posterior arm section 150 to each other as explained hereinafter.

Practically, the posterior arm section 150 is adapted to be mounted to the base 110, while the anterior arm section 130 is adapted for the pickup cartridge to be mounted thereto.

It is worth mentioning that the bridge section 140 may be considered to be part of the posterior arm section 150 without departing from the scope of the present description.

Figure 7:
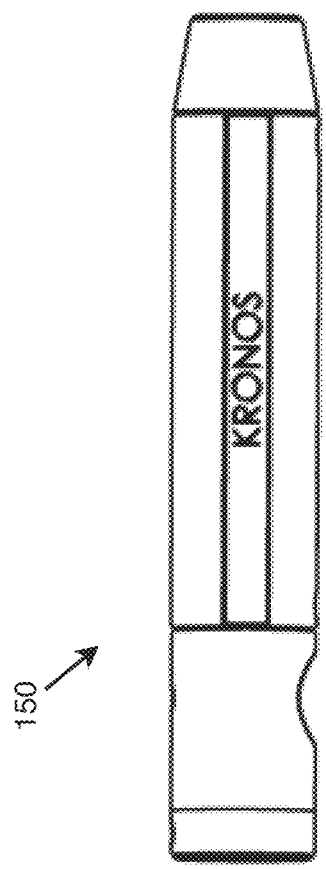
FIG. 7 is a side view of the posterior arm section of a tone arm in accordance with an embodiment.
Figure 8:
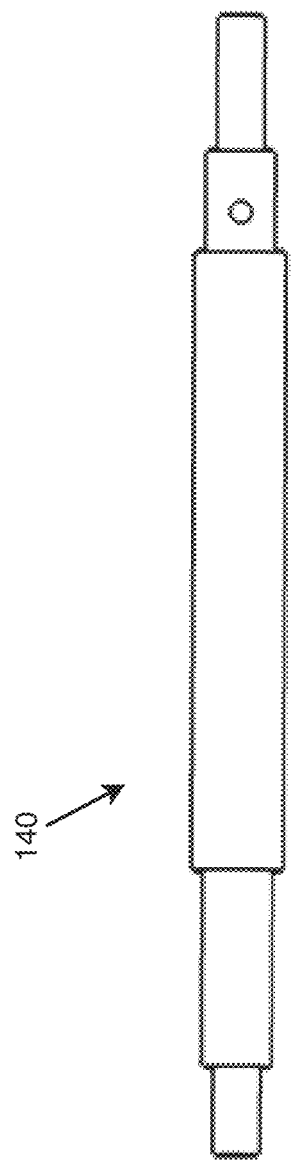
FIG. 8 is a side view of the bridge section of a tone arm in accordance with an embodiment.
Figure 9:
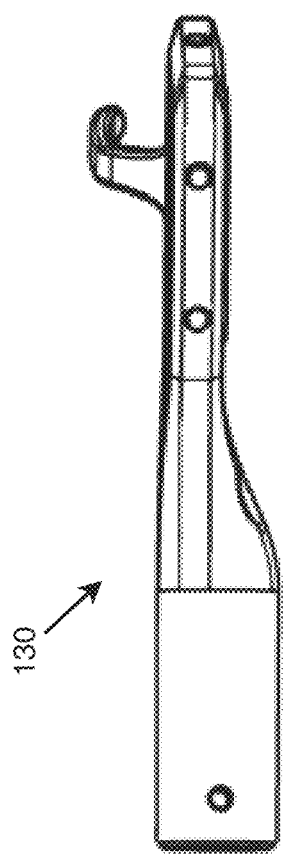
FIG. 9 is a side view of the anterior arm section of a tone arm in accordance with an embodiment.

Referring to FIGS. 7 to 9, the anterior arm section 130, the bridge section 140, and the posterior arm section 150 are manufactured independently from each other and are afterwards assembled to provide the tone arm 120.

According to realizations, the assembly of the anterior arm section 130, the bridge section 140 and the posterior arm section 150 may be permanent, or only one of the mountings, responsible for most of the vibration damping, is a permanent assembly.

Figure 10:
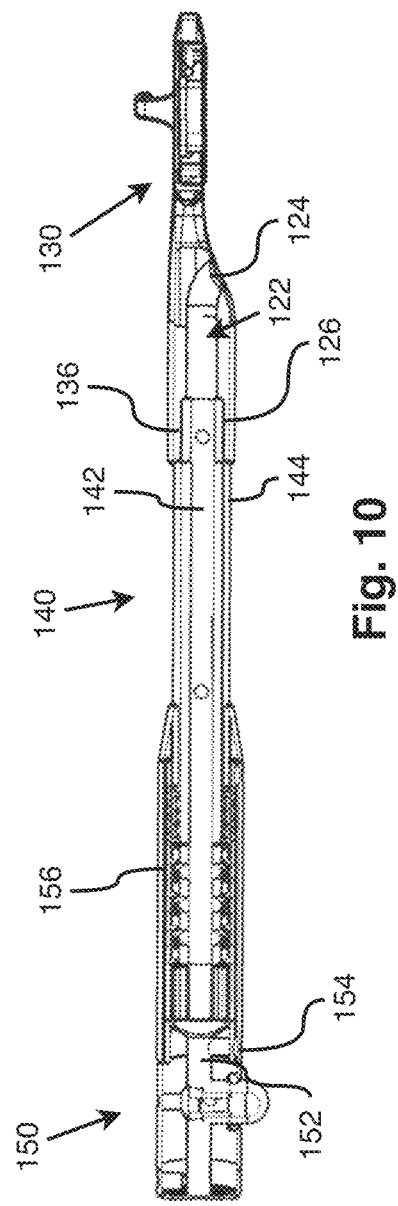
FIG. 10 is a plan cross-section view of the tone arm according to a cross-section plan A-A identified in FIG. 5.

Referring to FIG. 10, the tone arm 120 defines a channel 122 therein in which passes the wiring (not depicted) connecting the pickup cartridge to a signal processor. The channel 122 comprises an anterior opening 124 facing partially downward toward the location of the stylus once installed, extends throughout the bore 142 of the tubular bridge section 140, and extends axially into an axial passage 152 of the posterior arm section 150 up to the opening 154 about the mounting position of the posterior arm section 150 to the base 110.

The bridge section 140 features a cylindrical exterior face 144. Its front extremity is adapted to be inserted into the cylindrical chamber 136 of the anterior arm section 130 and its rear extremity is adapted to be inserted into the cylindrical chamber 156 of the posterior arm section 150.

Referring additionally to FIGS. 11 to 14, the cylindrical chamber 156 comprises an anterior section 158 and a posterior section 160, wherein the anterior section 158 is adapted to provide some clearance avoiding contact between the bridge section 140 and the posterior arm section 150 as the tone arm 120 may undergo some external forces. The posterior section 160 is adapted to provide the grip to e.g., permanently, hold the bridge section 140 in such a way as to provide the required rigidity for the stylus mounted about the anterior portion 114 to properly track the groove of a record while limiting the vibrations that one or the other of the extremities of the tone arm 120 may pick up from, e.g., the structure and the motor of the record player or the record being not absolutely flat.

The posterior section 160 has mounted thereto a mounting component 164 for connecting the exterior face 144 of the bridge section 140 to the interior face 162 of the chamber 156. The mounting component 164 comprises a plurality of discrete contact surfaces connecting, e.g., abutting, the exterior face 144 and the interior face 162, the discrete contact surfaces providing in-between channels 190 wherein vibration may be damped. On the interior side, the connection between the mounting component 164 and the exterior face 144 is secured using an elastomeric adhesive 168 being able, once cured, to undergo small deformation due to vibration without wear or cracks resulting therefrom.

Therefore, the mounting component 164 provides means for mounting components of the tone arm 120 to each other, wherein, for instance, the bridge section 140 may be considered part of the anterior arm section 130.

In a preferred realization, the elastomeric adhesive 168 consists of a naval-type resin, e.g., elastomeric epoxy, that remains relatively flexible once cured.

Figure 15:
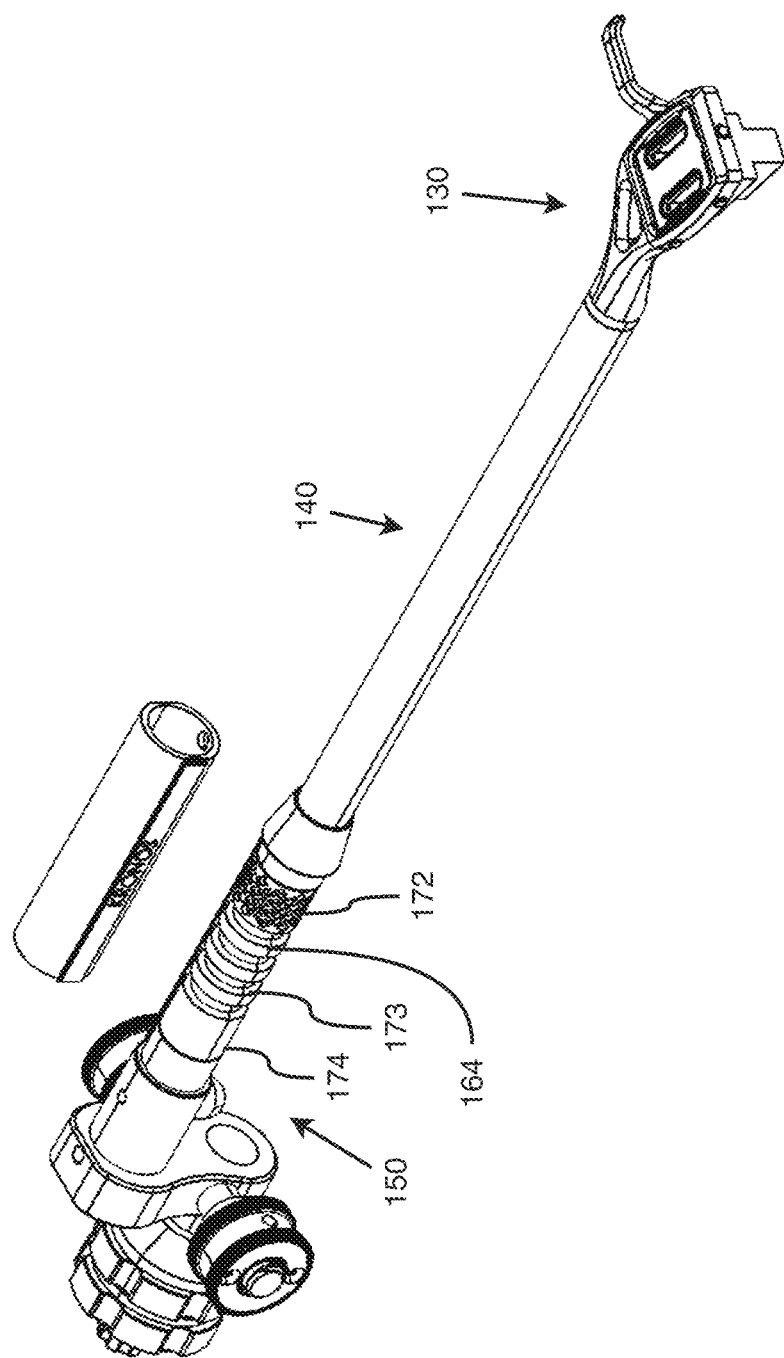
FIG. 15 is a perspective view of a tone arm with a shell portion of the posterior arm removed.
Figure 16:
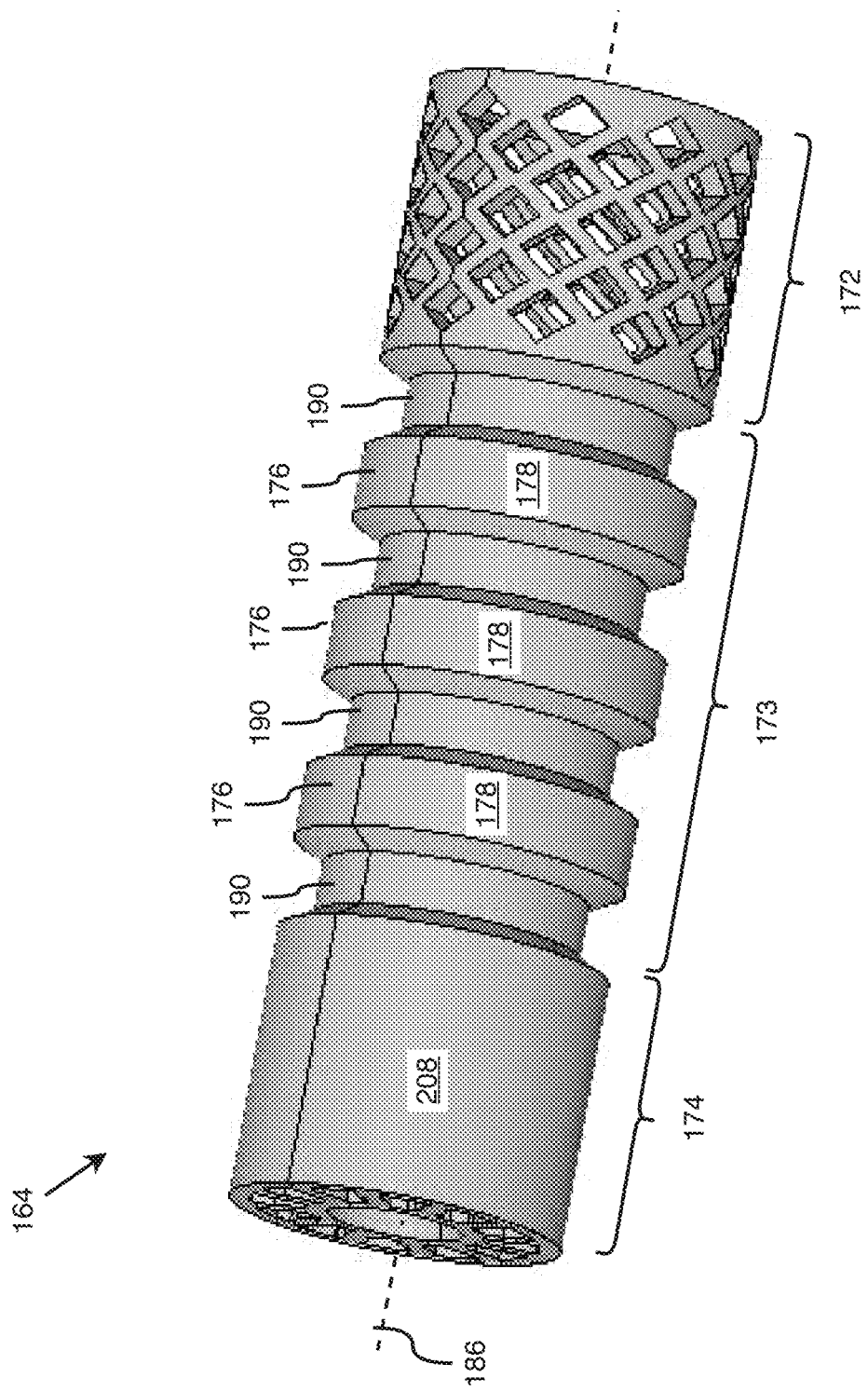
FIG. 16 is a perspective view of a mounting component in accordance with an embodiment.
Figure 17:
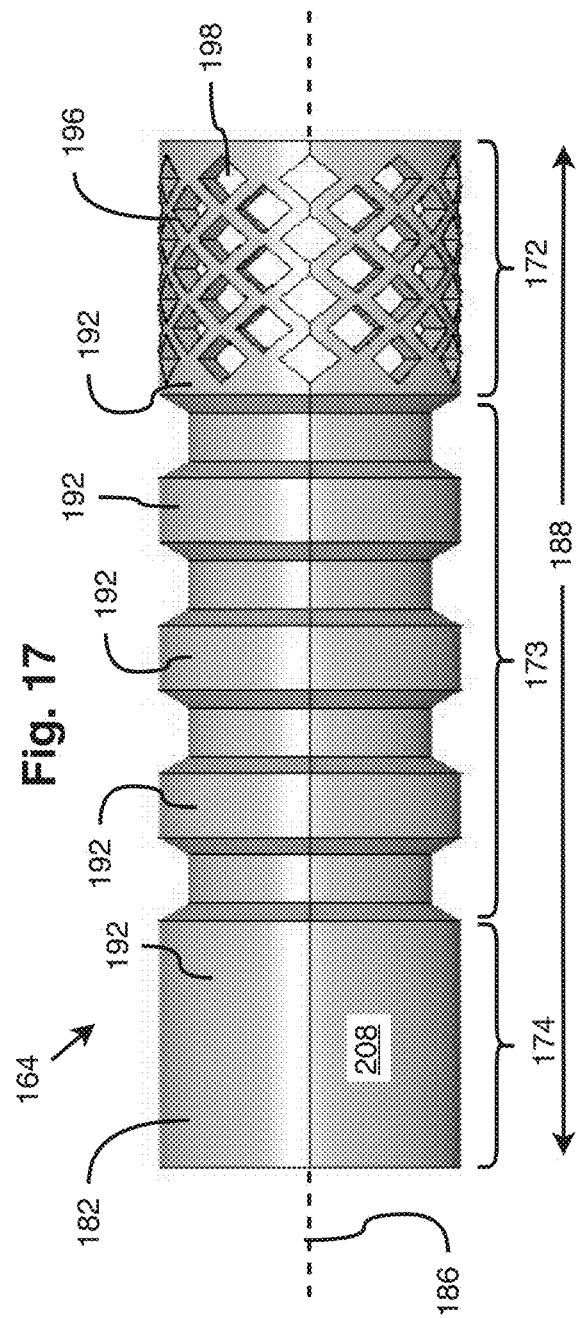
FIG. 17 is a side elevation view of the mounting component of FIG. 16.
Figure 19:
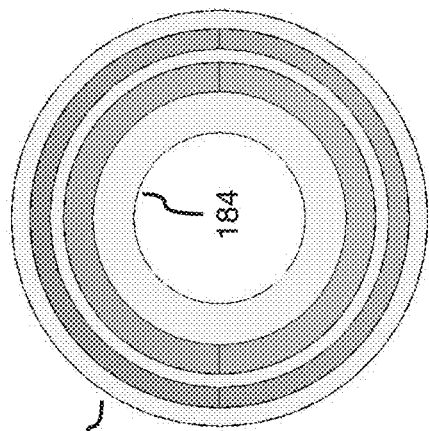
FIG. 19 is an axial elevation view of a second extremity of the mounting of FIG. 16.
Figure 18:
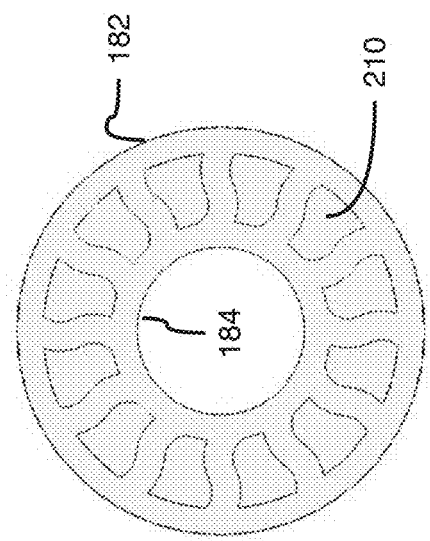
FIG. 18 is an axial elevation view of a first extremity of the mounting of FIG. 16.
Figure 20:
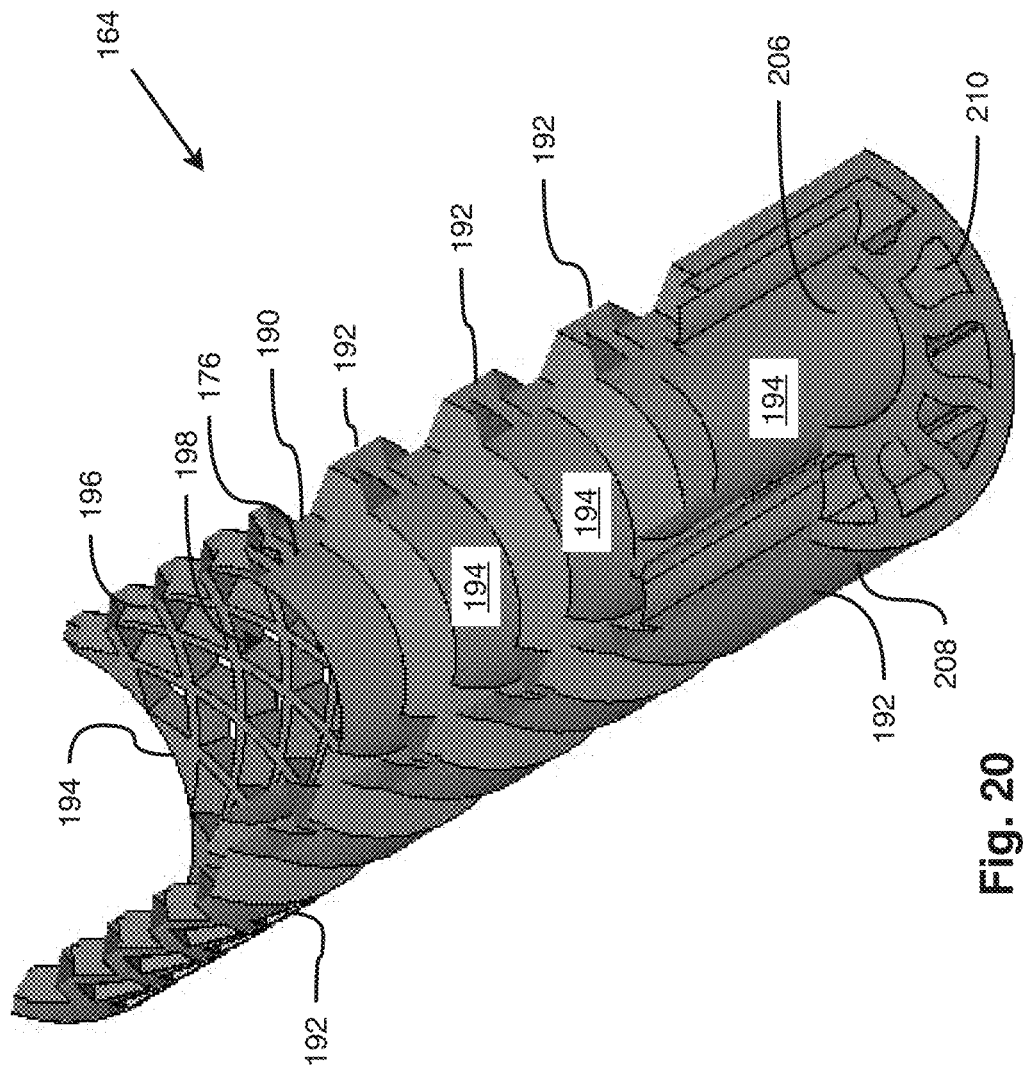
FIG. 20 is an oblique cross-section perspective view along its axis of the mounting of FIG. 16.
Figure 21:
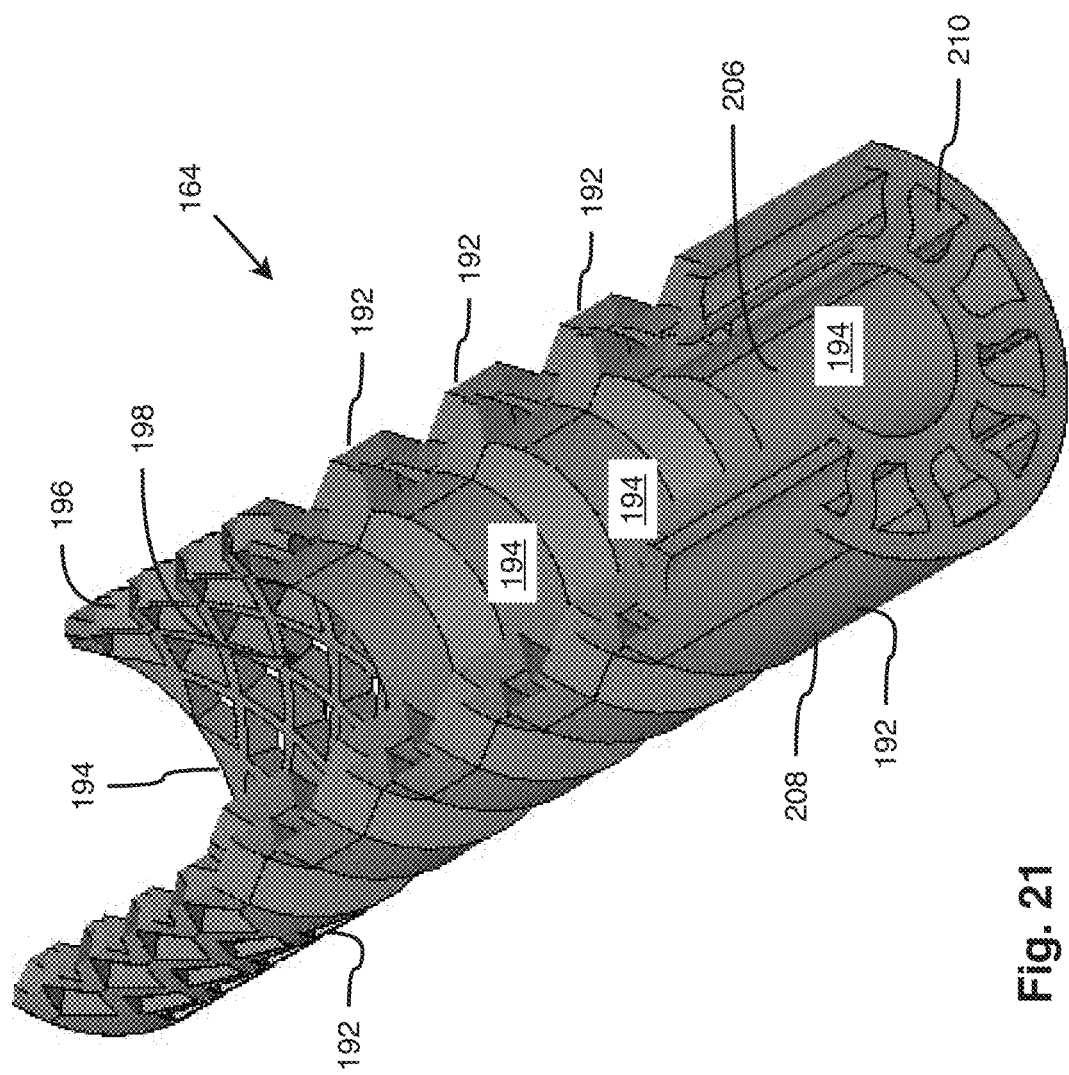
FIG. 21 is an oblique cross-section perspective view offset and parallel to its axis of the mounting of FIG. 16.

Referring additionally to FIG. 15, in a preferred realization, the mounting component 164 comprises an anterior portion 172, an intermediary portion 173, and a posterior portion 174 each providing at least one contact surface designed to abut a section of the tone arm 120, wherein the portions 172, 173, 174 provide a different geometry, thus responding differently to vibration frequencies.

Referring now to FIGS. 15 to 21, the mounting component 164 comprises an exterior wall 182 to be mounted through its periphery to the posterior arm section 150, and an interior wall 184 to be mounted through its periphery to the anterior arm section 130 through the bridge section 140. The mounting component 164 has a generally cylindric geometry, an axis 186 and a length 188. The mounting component 164 has a plurality of discrete external contact surfaces 192 and of discrete internal contact surfaces 194.

The anterior portion 172 has a net-like shape comprising a lattice of crisscrossed radially extending walls 196, preferably substantially thin walls, extending at an angle other than zero (0), aka parallel to the axis 186, and ninety (90) degrees, aka perpendicular to the axis 186. The crisscrossed geometry of the crisscrossed radially extending walls 196 defines openings 198, preferably a plurality over the length of the anterior portion 172, allowing deformation of the preferably substantially thin walls 196, and/or for applying elastomeric adhesive 168 therein. The anterior portion 172 further provides a uniform internal contact surface 202 and a uniform internal contact surface 204 punctuated with areas without contact where are openings 198.

The intermediary portion 173 comprises at least one, but preferably a plurality of ridges 176 with channels 190 separating the ridges 176. In a preferred embodiment, the ridges 176 and channels 190 are extending along a plane perpendicular to the axis 186 of the mounting component 164. In a preferred embodiment, the mounting component 164 in the intermediary portion 173 has a W shape in which ridges 176 and channels 190 are opposed to one another, wherein the opposed ridge 176 and channel 190 are one facing outward while the other facing inward. The channels 190, facing inward or outward, are designed to separate the exterior wall 182 and the interior wall 184 into discrete contact surfaces 192, 194.

Accordingly, the intermediary portion 173 has e.g., a lengthwise corrugated shape of e.g., three (3) and four (4) external/internal ridges 176 each having an apex 178 that is axially spaced apart from each other lengthwise, limiting the communication of vibrations undergone by one ridge to its neighbor ridge. The channels 190 in the intermediary portion 173 or between the portions 172, 173, 174 provide a space for the elastomeric adhesive 168 to fill at least partially when curing.

The posterior portion 174 has a generally cylindrical shape partially hollow having a uniform internal contact surface 206 and a uniform external contact surface 208, with conduits 210 extending parallel to the axis 186, wherein the conduits 210 ease deformation of the posterior portion 174.

Preferably, the mounting component 164 is made of material designed to damp vibrations through small deformations and/or the presence of pores, for example molded pulp, or molded fiber of density and with port-processing adapted for that use.

Preferably, the mounting component 164 is adapted to surround the whole periphery of the bridge section 140, the mounting component 164 having a tubular, cylindrical, shape.

According to other embodiments, part of the mounting component 164 may provide a generally spiral-like contact surface, or a series of radial, potentially parallel contact surfaces. Regardless of the embodiments, it is preferable that the resulting configuration of the contact surfaces is adapted to resist movement in any radial direction, aka in any outward direction around the bridge section 140.

Accordingly, the connection between the posterior arm section 150 and the bridge section 140 damps and limits communication of vibrations over the length of the tone arm 120 that may potentially decrease the efficacy of the record player, thus providing a resonant suppressor there-between.

While preferred embodiments have been described above and illustrated in the accompanying drawings, it will be evident to those skilled in the art that modifications may be made without departing from this disclosure. Such modifications are considered as possible variants comprised in the scope of the disclosure.

The invention claimed is:

1. A tone arm for a record player, the tone arm comprising:
    an anterior arm section adapted for mounting a pickup cartridge thereto;
    a posterior arm section adapted for mounting the tone arm to the record player, the posterior arm section comprising an open chamber; and
    a mounting component mounted in the chamber, the mounting component comprising i) a first contact surface for butting against the anterior arm section and ii) a second contact surface butting against the posterior arm section, whereby the mounting component secures the anterior arm section and the posterior arm section to each other,
    the mounting component comprising a plurality of mounting-component sections having a different wall structure selected from the group of wall structures consisting of:
        a) a wall structure consisting of crisscrossed radially extending walls;
        b) a wall structure comprising, in longitudinal sequence, a first channel that does not butt against a first arm section among the anterior arm section and the posterior arm section, a radial ridge that butts against the first arm section, and a second channel that does not butt against the first arm section; and
        c) a wall structure providing a first face that butts against the anterior arm section and a second face that butts against the posterior arm section, the wall structure comprising a plurality of hollow conduits extending longitudinally between the first face and the second face,
    wherein each one of the mounting-component sections is made of a different one of the wall structures whereby each one of the mounting-component sections is transmitting longitudinally sound waves differently.

2. The tone arm of claim 1, further comprising an elastomeric adhesive securing at least one of:
    a) the anterior arm section to the mounting component; and
    b) the mounting component to the chamber of the posterior arm section open chamber.

3. The tone arm of claim 2,
    wherein the elastomeric adhesive is deposited in the first and second channels.

4. The tone arm of claim 2, wherein the elastomeric adhesive is adapted to damp vibration between the anterior arm section and the posterior arm section.

5. The tone arm of claim 2,
    wherein the elastomeric adhesive is deposited in openings between the crisscrossed radially extending walls.

6. The tone arm of claim 1, wherein the crisscrossed radially extending walls make a lattice.

7. The tone arm of claim 6, wherein the lattice comprises radial openings.

8. The tone arm of claim 7, wherein the mounting component has a plurality of the radial openings extending side-by-side.

9. The tone arm of claim 1, wherein the anterior arm section comprises a mounting surface,
    wherein a first one of the plurality of mounting-component sections provides a first contact section that butts against the mounting surface of the anterior arm section, wherein a second one of the plurality of mounting-component sections provides a second contact section that butts against the mounting surface of the anterior arm section, and wherein the first contact section and the second contact section are isolated from each other over the mounting surface of the anterior arm section.

10. The tone arm of claim 1, wherein the posterior arm section comprises a mounting surface, wherein a first one of the plurality of mounting-component sections provides a first contact section that butts against the mounting surface of the posterior arm section, wherein a second one of the plurality of mounting-component sections provides a second contact section that butts against the mounting surface of the posterior arm section, and wherein the first contact section and the second contact section are isolated from each other over the mounting surface of the posterior arm section.

11. A mounting component for coupling two arm sections comprising i) an anterior arm section adapted for mounting a pickup cartridge thereto, and ii) a posterior arm section adapted to be mounted to a record player, the posterior arm section comprising an open chamber, the mounting component comprising:

i) a first contact surface for coupling to the anterior arm section; and ii) a second contact surface for coupling to the posterior arm section with the anterior arm section mounted thereto, wherein one of the first contact surface and the second contact surface comprises a plurality of discrete contact sections for butting against a corresponding arm section wherein the discrete contact sections provide together a noncontinuous contact surface between the mounting component and the corresponding arm section, and wherein the plurality of contact sections differ from each other at least in at least one of i) in shapes of the contact sections, and ii) in sizes of the contact sections.

12. The mounting component of claim 11, further comprising at least one ridge having an apex providing one of the contacts sections.

13. The mounting component of claim 11, further comprising a channel located between two contact sections.

14. The mounting component of claim 11, further comprising an interior wall, an exterior wall, an axis, and a partially hollow portion comprising a plurality of conduits extending in parallel to the axis between the interior wall and the exterior wall.

15. The mounting component of claim 11, wherein one of the contact sections comprises a lattice of crisscrossed radially extending walls.

16. The mounting component of claim 11, further comprising an interior wall, an exterior wall, and an axis, wherein the mounting component comprises at least two portions each having a different wall structure selected from the group of wall structures consisting of:

a) a wall structure consisting of crisscrossed radially extending walls;

b) a wall structure comprising, in longitudinal sequence, a first channel that does not butt against a first arm section among the anterior arm section and the posterior arm section, a radial ridge that butts against the first arm section, and a second channel that does not butt against the first arm section; and c) a wall structure providing a first face that butts against the anterior arm section and a second face that butts against the posterior arm section, the wall structure comprising a plurality of hollow conduits extending longitudinally between the first face and the second face, wherein the at least two portions provides the plurality of discrete contact sections.

17. The mounting component of claim 11, wherein at least two of the plurality of discrete contact sections are between the mounting component and a single one of the of i) the anterior arm section and ii) the posterior arm section.

* * * * *